Figure 1:
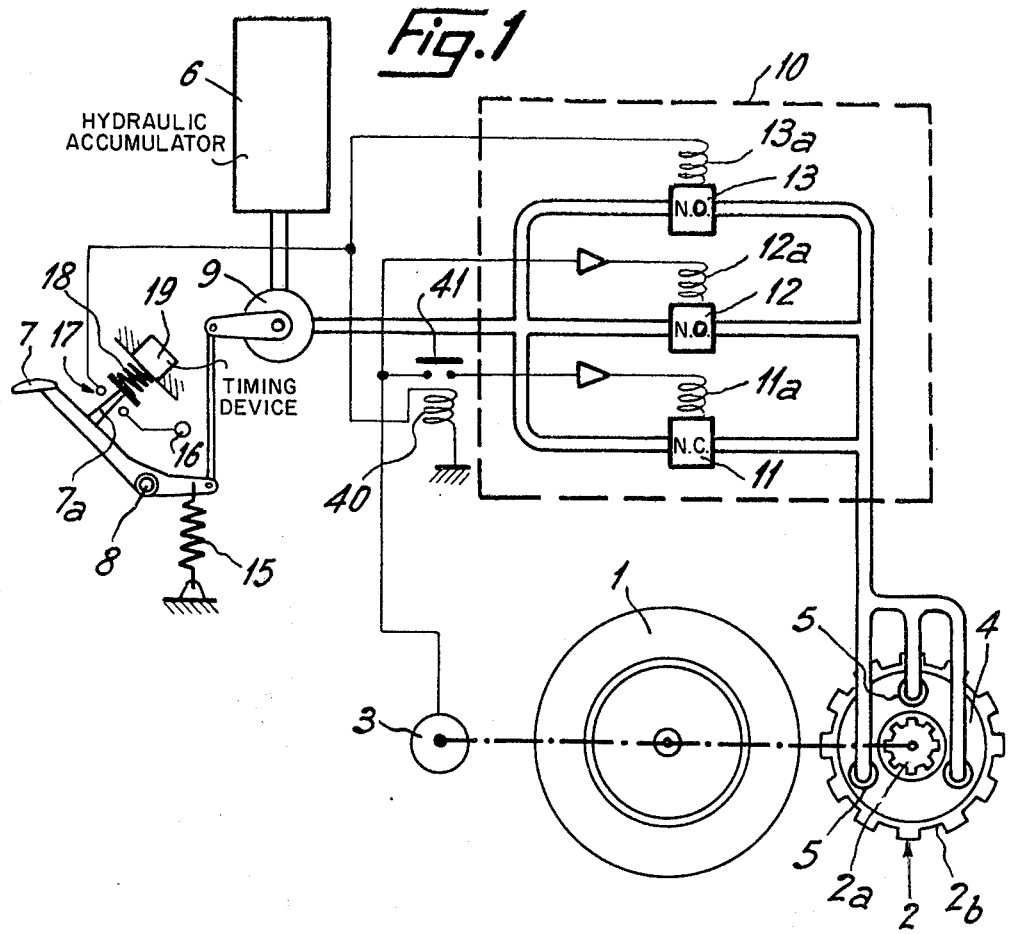

United States Patent [19]
Gentet et al.

[11] 3,948,569
[45] Apr. 6, 1976

[54] DEVICES FOR CONTROLLING CARBON DISC BRAKES, MORE PARTICULARLY FOR AIRCRAFT

[75] Inventors: Pierre Gentet, Colomiers; Louis Signorelli; Alain Yves Louis Marcel Geoffroy, both of Toulouse, all of France

[73] Assignee: Societe Nationale Industrielle Aerospatiale, Paris, France

[22] Filed: Aug. 26, 1974

[21] Appl. No.: 500,737

[30] Foreign Application Priority Data
Sept. 5, 1973 France .............................. 73.32016

[52] U.S. Cl. ................. 303/21 A; 244/111; 303/20
[51] Int. Cl.[2] ......................................... B60T 8/02
[58] Field of Search ............. 188/71.5, 73.2, 106 P, 188/106 F, 349; 244/111; 303/3, 15, 20, 21; 317/5; 324/160–161; 340/53, 62, 263

[56] References Cited
UNITED STATES PATENTS

| | | | |
|---|---|---|---|
| 2,160,207 | 5/1939 | Hewitt | 303/21 CF |
| 2,191,822 | 2/1940 | Farmer | 303/21 CF |
| 2,270,413 | 1/1942 | Canetta | 303/21 CF |
| 2,872,541 | 2/1959 | Oppenheim et al. | 303/21 CF X |
| 3,233,153 | 1/1966 | Ryan | 303/21 CF UX |
| 3,394,967 | 7/1968 | Lucien | 303/21 BE |
| 3,606,493 | 9/1971 | Schlitz et al. | 303/21 CF |
| 3,664,712 | 5/1972 | Hiscox | 303/21 CF |
| 3,682,515 | 8/1972 | Packer et al. | 303/21 BE |
| 3,759,353 | 9/1973 | Marin | 188/73.2 X |
| R20,613 | 1/1938 | Tarsien | 303/21 CF |

Primary Examiner—Trygve M. Blix
Assistant Examiner—Stephen G. Kunin
Attorney, Agent, or Firm—Karl W. Flocks

[57] ABSTRACT

A braking system for an aircraft undercarriage with carbon disc brakes comprises apparatus responsive to the rotational speed of the wheels for regulating the rate of increase of braking pressure.

7 Claims, 8 Drawing Figures

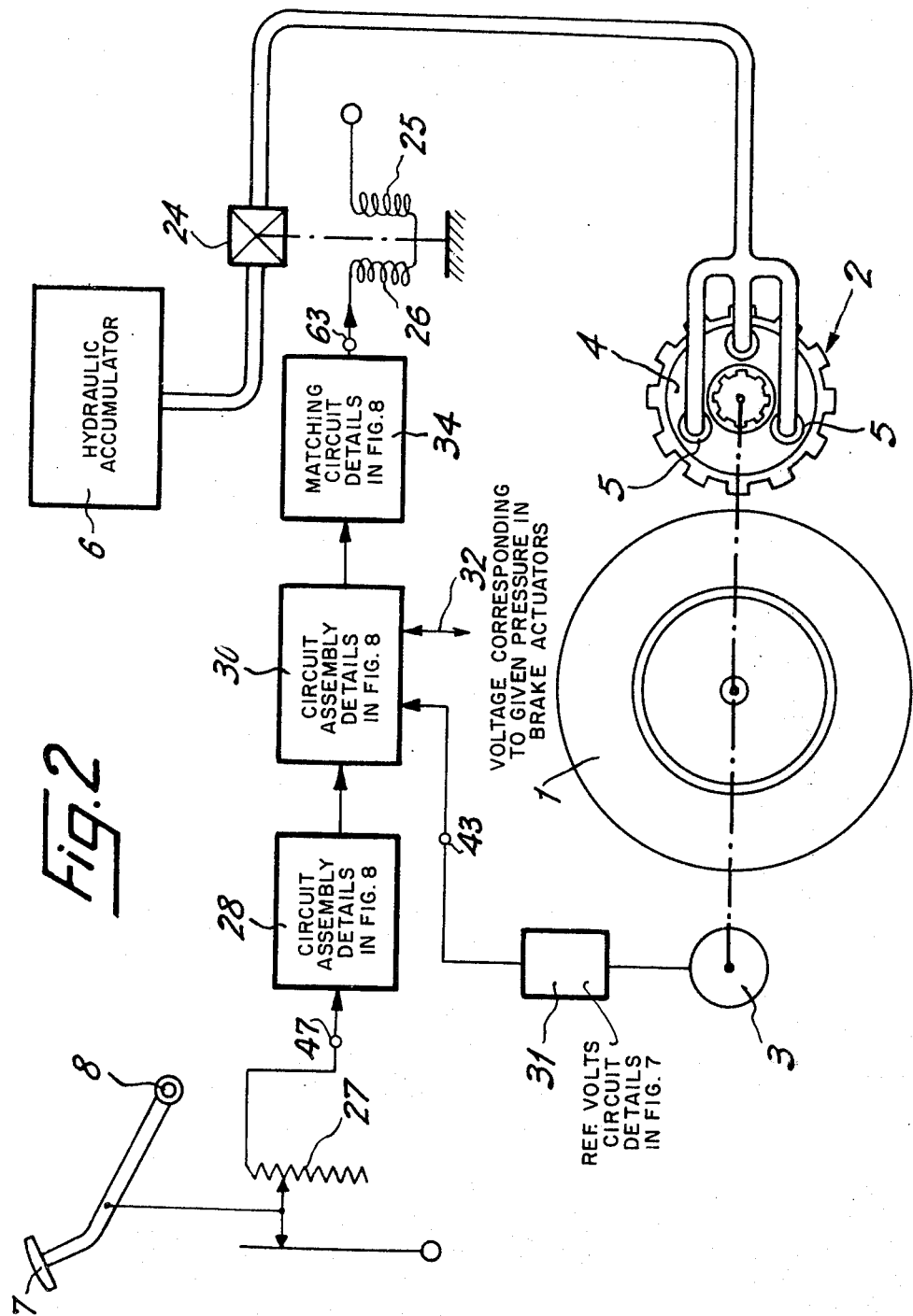

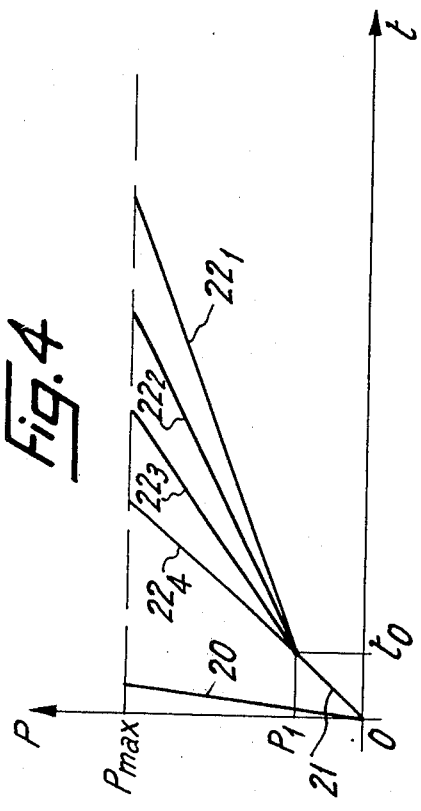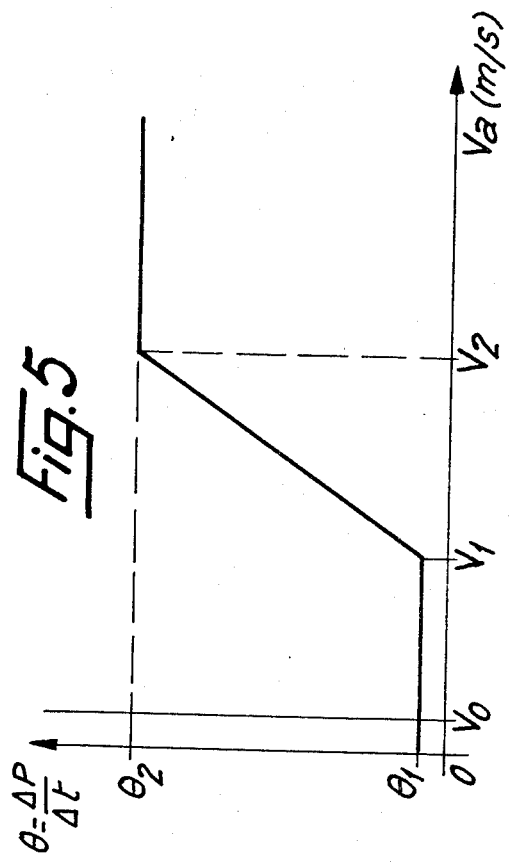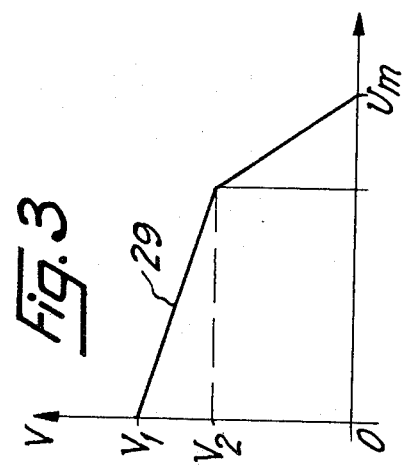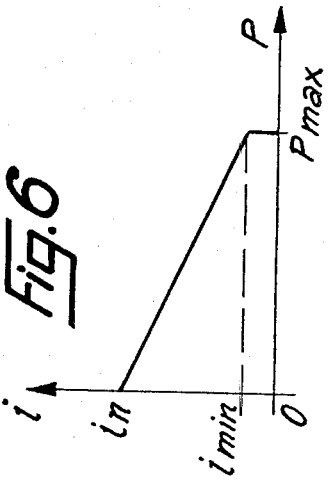

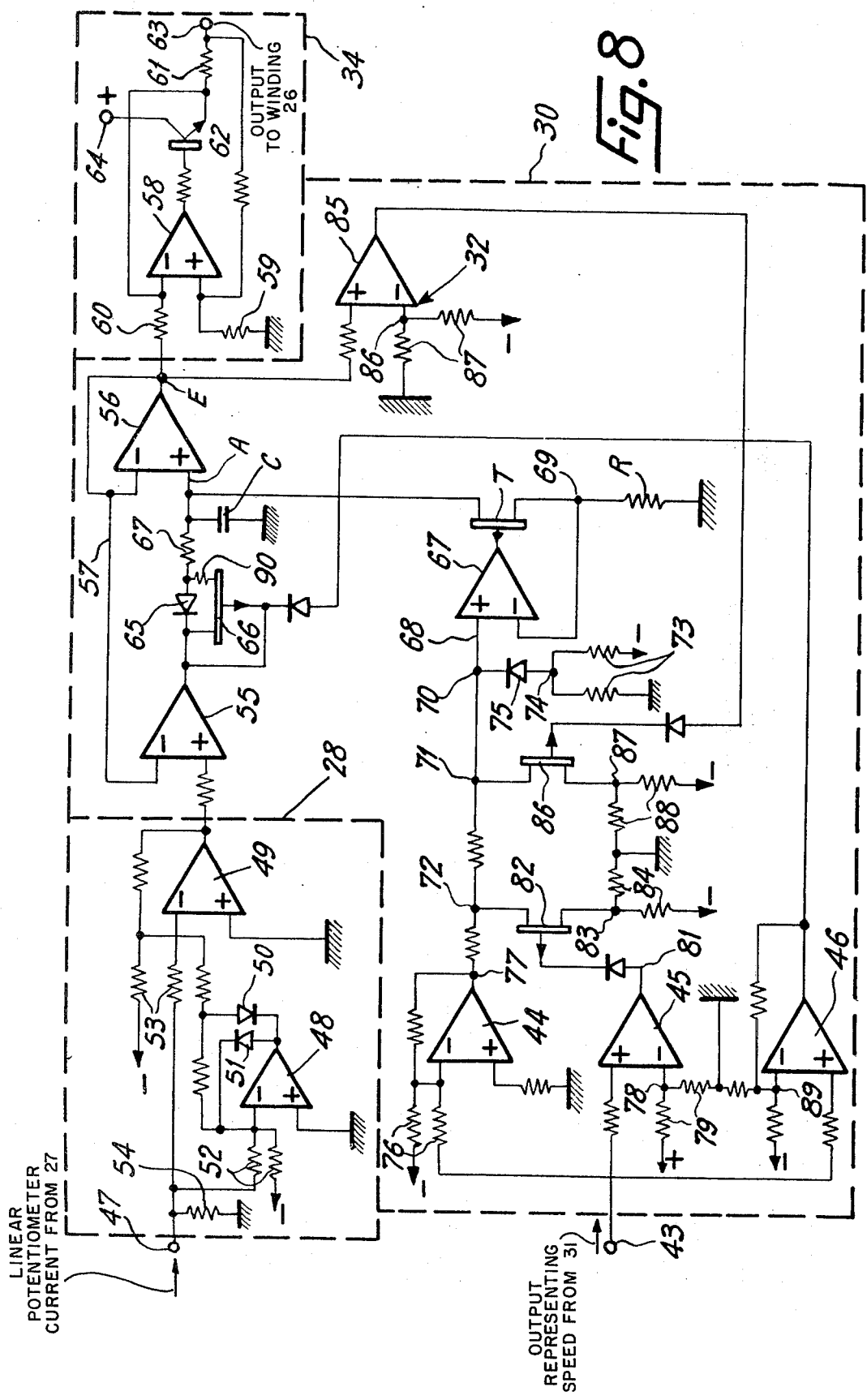

DEVICES FOR CONTROLLING CARBON DISC BRAKES, MORE PARTICULARLY FOR AIRCRAFT

The invention relates to a method and devices for working the method of controlling carbon disc brakes, more particularly brakes used in aircraft undercarriages.

As is known, it has already been proposed to use practically pure carbon, i.e. a compressed compound of graphite and amorphous carbon, for brake discs.

The discs, which constitute the brake friction element and dissipate the thermal energy of braking, have the advantage of considerably reducing the weight of aircraft. The reduction may be several hundred kilograms for an aircraft weighing about 100 tons.

The use of carbon discs, however, is tricky since, if they are clumsily operated, they may burst, resulting in a serious risk of an accident.

The reason is that carbon discs have a spontaneous automatic-braking thermal effect. When the brakes are applied and the disc heats, the coefficient of friction increases and this, for a given braking pressure, increases the resisting torque and consequently increases the heating and further increases the resisting torque.

The invention relates to a method and brake control devices which obviate this disadvantage but which enables the user to operate the brakes in a similar manner to conventional brakes comprising steel discs or drums.

More particularly, the invention provides for normal use of the brakes on landing, maximum braking during emergency stopping and an immediate stoppage at very low taxiing speeds, but also limits the increase in the dynamic braking torque, more particularly at medium taxiing speeds; in such cases, owing to the relatively low speed, the ventilation effect cooling the brake discs is limited and the kinetic energy of the moving mass may be insufficient to keep it in motion and overcome the automatic braking effect which increases until the aircraft stops.

The method according to the invention of controlling a hydraulic carbon-disc brake consists in progressively increasing the hydraulic braking pressure at a rate of increase having a slope which decreases with the reduction in the rotation speed of the brake discs.

Preferably, the reference rotation of the discs is obtained by a tachometric dynamo secured to the wheel, thus obtaining a signal which can be used both in mechanical, pneumatic or hydraulic embodiments of the invention and in a preferred embodiment in which the final signal controlling the arrival of hydraulic fluid in the brake actuator is obtained by purely electrical means.

In order to ensure an immediate stoppage at low speeds, e.g. below 2 or 3 m/s, means can be provided for either neutralizing the effect of the device according to the invention at the aforementioned speeds or by limiting the increase in pressure to an arbitrary high value.

In an advantage embodiment of the invention, at low speeds, e.g. up to 20 meters per second (72 km/hour), the rate of increase is maintained at a low level, e.g. of the order of 6 bars per second.

At high speeds, more particularly during emergency stopping when the take-off speed has practically been reached, it should be possible to stop the aircraft as quickly as possible, starting from a given speed, e.g. 45 meters per second (approx. 160km/hour). Accordingly, the rate of pressure increase is made the highest possible which is compatible with the absence of a risk of automatic braking. For example, to fix ideas, the pressure can be made to increase at a rate of the order of 100 bars/second.

Between these two speed thresholds, the rate of pressure increase can be varied continuously, e.g. in linear manner.

Preferably, however, in order to obtain rapid and effective deceleration, the braking pressure at the beginning of braking should as soon as possible reach a value such that, while avoiding any danger of automatic braking, the pressure is sufficient to decelerate the vehicle very considerably. To fix ideas, the resulting pressure may be one-third of the maximum pressure, e.g. 80 bars for a maximum pressure of the order of 200 to 250 bars.

Assuming that this pressure is reached at the aforementioned maximum rate of increase (100 b/s), 0.8 seconds will elapse before this pressure level is operative in the actuator. If the braking pressure needs to be higher as aforementioned, the rate of pressure increase above this level is adjusted in dependence on the speed.

The invention can be embodied by hydraulic means supplying a or the brake actuators from a pressure source via pipes in parallel, at least one of which is provided with a solenoid valve controlled in accordance with the taxiing speed.

Preferably, electrical signals respectively determining the desired braking pressure, the actual taxiing speed, the speed thresholds from which a variation in the rate of pressure increase is desired and the pressure threshold which is acceptable without adjustment, are used to prepare a signal controlling a solenoid valve supplied by a pressure liquid accumulator and in known manner comprising a pressure reducing valve, the opening speed and the final opening of which are dependent on the control current.

For safety, the valve is normally kept open and the control current, which is at a maximum in the inoperative state, keeps the valve closed, whereas when the current decreases it enables the valve to open gradually to an extent which is predetermined by the position of the brake control means.

In an assembly of the aforementioned kind, substantially linear voltage variations within predetermined limits may advantageously be obtained by using electronic circuits including field effect transistors.

Preferably, the brake control means acts on the assembly via a potentiometer control means which is advantageously linear and adjusted in a suitable circuit so that, for example, a variation corresponding to approximately half of the available pressure is obtained when the means moves through three-quarters of its travel, and the other half is obtained for the last quarter of the travel. This modification in the signal provided by the control means, more particularly a brake pedal, ensures that the brake control means is highly accurate during normal operation and very rapid when a transition has to be made from normal to emergency braking.

Figure 7:
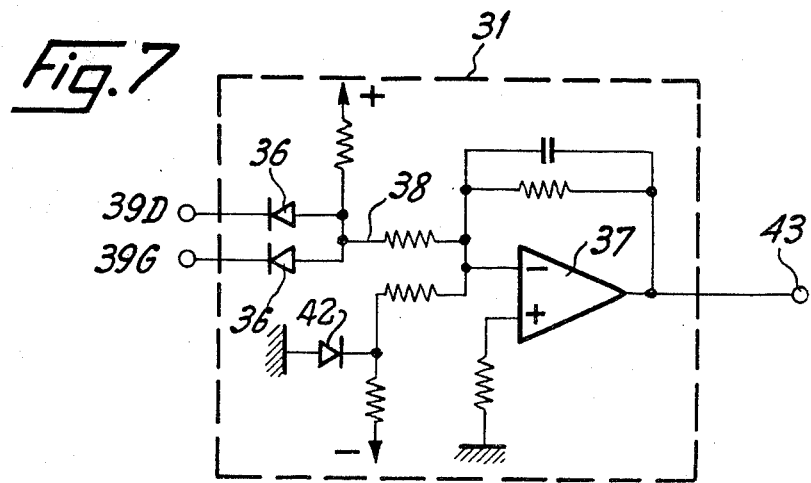

The following description and accompanying drawings will clearly show how the invention can be put into practice. In the drawings:

FIG. 1 diagrammatically shows a mainly hydraulic embodiment of the invention,

FIG. 2 diagrammatically shows a more elaborate embodiment of the invention,

FIGS. 3 to 6 are diagrams showing the variation in the functions used in the embodiments in FIGS. 1 and 2, FIG. 7 is a diagram of an assembly supplying the reference voltage corresponding to the taxiing speed in the case of a vehicle having a number of wheels which have to be simultaneously braked, and FIG. 8 is an electric circuit diagram corresponding to the embodiment in FIG. 2.

In the assembly diagrammatically shown in FIG. 1, a wheel 1, e.g. in an undercarriage, is associated with a stack 2 of carbon discs secured alternately to the wheel hub and to a stationary bearing frame by splines 2a and 2b. The hub is also secured to the shaft of a tachometric dynamo 3. Hydraulic actuators 5 supplied by a hydraulic accumulator 6 by the control assembly act on stack 2 via an annular plate 4.

A brake pedal 7 pivoting around a shaft 8 acts either directly or via a conventional device, of the kind used with steel discs to control a valve system 9 including a pressure reducing valve which determines a pressure in dependence on the position of the pedal and supplies actuator 5 via a device 10 for varying the pressure increase.

Device 10 comprises three branch pipes in parallel each controlled by a solenoid valve. A first normally-closed valve 11, which is adapted to throttle the supply of liquid, is gradually opened in dependence on the current supplied to its winding 11a by dynamo 3. Consequently, when the wheel speed increases, there is a correspondingly rapid increase in the pressure in actuator 5.

A second, normally open on-off valve 12 introduces a slight pressure drop into the actuator supply system. It is closed by the current from dynamo 3 flowing through winding 12a when the taxiing speed becomes greater than $V_0$, e.g. 2 meters per second.

A third valve 13 is normally open. It is closed when its winding 13a receives current from the vehicle via terminal 16 across a time-delay switch 17. Switch 17 is kept open by a lug 7a of pedal 7, owing to the tension of the return spring 15 of pedal 7.

When the pedal is acted upon, spring 18 tends to close the switch but the closure is delayed by the timing device 19, which is e.g. a dash-pot.

At the beginning of braking, therefore, valve 13 throttles the fluid only slightly and the branch pipe controlled by valve 13 enables the actuator pressure to increase rapidly during a time determined by device 19.

In order to prevent interference between valves 11 and 13, switch 17 can close the supply circuit to winding 11a, via a relay 40 and a normally open contact 41.

Valve 13 is open long enough to reach a pressure level $P_1$ representing a fraction (i.e. from approximately ⅓ to ½) of the maximum pressure, e.g. a pressure of the order of 80 bars for a maximum pressure of 200 to 250 bars. This level ensures a powerful decelerating effect without any risk of automatic braking.

The result obtained by the assembly in FIG. 1 can be represented by the diagram in FIG. 4.

At very low speeds (below 2m/s) valve 12 remains open and the increase with time in the actuator pressure follows a very steep curve such as 20 up to a maximum pressure $P_{max}$. At these low speeds, there is no serious risk in jamming the disc on an undercarriage, since the resilient suspension of the undercarriage reduces the impact due to the sudden stop.

When the speed is higher and valve 12 is closed, during a first period (from 0 to $t_0$) the pressure increases rapidly to a pressure $P_1$ as shown by the curved portion 21 whereupon, valve 13 being closed, the pressure increase follows a curve such as curves $22_1$ to $22_4$, which are determined by valve 11 and which have slopes which decrease in proportion to the decrease in the wheel speed.

The increase is always selected so as to avoid thermal automatic braking; to this end also, the maximum slope permitted by valve 11 is equal to the maximum slope permitted by valve 13 (lines 21 and $22_4$, which are in line with one another).

More accurate relation can be obtained by the assembly shown in FIG. 2, which has the advantage of using only one solenoid valve 24 which, in conventional manner, simultaneously determines the final control pressure and the increase therein.

When the brake pedal is inoperative, valve 24 is normally kept shut by the current travelling through winding 26, which receives a combination of the different electric signals from the assembly. A second winding 25 is connected to a brake regulating device which adjusts the valve opening in the case where the wheels are locked.

In the inoperative position therefore (FIG. 6), the control device supplies winding 26 with a current $i_n$ which maintains a zero pressure in actuators 5, whereas when the current drops to the level $i_{min}$, the jacks receive the pressure $P_{max}$. Intermediate currents determine the value of the pressure admitted to the actuators, the pressure becoming stable when the current is stabilized. In the latter case, the motion of pedal 7 produces a linear variation in a voltage taken from potentiometer 27, which is supplied by voltage from the vessel.

Advantageously the resulting potential is modified in an assembly 28 (shown in detail in FIG. 8) so that the rate of variation in the potential corresponds to the diagram illustrated in FIG. 3. When the voltage U sampled at potentiometer 27 varies during the total travel of the potentiometer from zero to the value $U_m$, the variation in the voltage at the output of assembly 28 follows the broken line 29.

Consequently, voltage V varies slowly and in linear manner from $V_1$ to $V_2$ during most of the pedal travel, and then decreases rapidly from $V_2$ to zero at the end of the travel.

Accordingly, the beginning of pedal actuation corresponds to substantial braking, e.g. up to a value of 100 to 120 bars in the example already given, after which, e.g. to obtain emergency stopping, the final reduced travel of the pedal increases the pressure to the maximum value (200 to 250 bars in the example quoted).

The output voltage of assembly 28 is fed to assembly 30 (shown in detail in FIG. 8) at the same time as the voltage of tachometric dynamo 3 adjusted in assembly 31 (shown in FIG. 7) and a fixed reference pressure diagrammatically indicated by arrow 32.

This assembly is designed to obtain, not only the ratio of variation shown in FIG. 4, but also the rate of variation illustrated in the complementary FIG. 5.

In FIG. 5, the differential with respect to time of the pressure variation ($\Delta P/\Delta t$) is represented in dependence on Va (e.g. the aircraft speed).

As already indicated, the variation $\theta = \Delta P/\Delta t$ may be practically infinite below $V_o$ (2 m/s).

Between $V_0$ and $V_1$, i.e. at low aircraft speeds up to e.g. 20 m/s, the value of $\Delta P/\Delta t$ is maintained at $\theta_1$, e.g. 6 bars per second. We repeat that the dangers of automatic braking are greater at low speeds but vehicles are easier to stop at these speeds.

From $V_1$ to $V_2$ ($V_2$ being e.g. of the order of 45 m/s), the value of $\Delta P/\Delta t$ increases to the permitted maximum $\theta_2$ (e.g. 100 b/s), but the rate of increase above this speed is limited to the maximum rate of increase. The maximum rate is also the rate which, as shown in FIG. 4, is required for reaching the pressure $P_1$ at the time $t_0$. Thus, in the case of a variation of 100 b/s, the pressure $P_1$ of 80 bars will be reached after 0.8 seconds.

The signal from assembly 30 is input into a matching circuit 34 generating a current proportional to the voltage (shown in FIG. 8) for supplying winding 26. As already stated, the current varies in dependence on the desired pressure as illustrated in FIG. 6.

In a practical application to a heavy aircraft as illustrated in the drawings, each main wheel in the undercarriage corresponds to a brake pedal (which facilitates piloting during taxiing) associated with a chain of electronic circuits for controlling the wheel. In order, however, to balance the control chains, the two chains are supplied by assembly 31 via the same tachometric dynamo, i.e. the dynamo which supplies the higher voltage at each instant.

In the aforementioned assembly (FIG. 7), the two dyanamos 3D and 3G (not shown) are respectively connected to the input terminals 39D and 39G of an amplifying assembly having a high input impedance so that the current sampled by the assembly produces only a slightly perturbation in the voltage from the dynamos. Diodes 36 prevent one of the dynamos from supplying the other, so that the higher voltage of the two is the only voltage which is applied to the negative terminal of the linear amplifier 37 via voltage divider 38 which determines the amplification level with respect to earth. Diode 42 enables a current leak to occur and thus compensates the perturbation resulting from the voltage drop produced by the diode 36 which is in operation.

In FIG. 8, the output voltage representing the speed and coming from assembly 31 is applied via terminal 43 to three amplifiers 44, 45 and 46.

The linear potentiometer current supplied by a brake pedal is converted into voltage by resistor 54 and the voltage is input via terminal 47; it is fed in parallel to the negative terminals of two operational amplifiers 48 and 49. The output of amplifier 48 is also connected to the negative terminal of the second amplifier via a diode 50.

The positive terminals of the two amplifiers are respectively connected to earth. The negative feedback of the first amplifier is provided by a diode 51. In addition, the potentiometer current is applied to the amplifiers via voltage dividers 52 and 53 respectively, which determine the average input level thereof.

At high values of the input current, the output of amplifier 48 is positive; diode 51 returns the positive voltage and practically cancels the voltage difference between the input terminals, so that amplifier 48 is inoperative.

At lower values, the negative output voltage is conveyed to amplifier 49 by diode 50, so that the slope of the output voltage thereof increases. Consequently, the broken-line voltage variation which is shown in FIG. 3 is obtained.

The negative output voltage of amplifier 49 is fed to the positive input of amplifier 55, whose output is connected via a time-delay assembly described hereinafter to the positive input of amplifier 56.

Owing to a direct negative feedback connection (57) between output E of amplifier 56 and its negative input and the negative input of amplifier 55, the two amplifiers form a follower assembly, i.e. the two input and output voltages tend to be constantly equal to one another.

The voltage collected at E is converted into a proportional current in assembly 34, which is known, so as to supply winding 26.

Assembly 34 comprises an amplifier 58 comprising input resistors 59, 60 having a high value (e.g. 100 K $\Omega$), the output of amplifier 58 supplying the base of a transistor 62 outputting to a resistor 61 having a relatively low value (e.g. 100 $\Omega$). In the aforementioned circuit having the aforementioned resistance values, the current available at output 63 is equivalent in milliamperes to the voltage at E expressed in volts and, since the amplifier supplies only the current of the transistor base, the current is mainly provided by the voltage from the vessel, applied to terminal 64.

The voltage at E, whose actual value is the image of the actual value of the pressure in actuators 5, is determined by the value of the voltage at A, which in turn depends on the charging state of capacitor C. Consequently, the voltage at E will reach the value corresponding to the actual position of the brake pedal, but only after the capacitor has been completely charged, the duration of the charge thus determining the rate of pressure increase in actuators 5.

The connection between the output of amplifier 55 and the input A of amplifier 56 comprises a diode 65, which can be short-circuited by a field effect transistor 66, and a protective resistor 67.

The normal path for modifying the charge of capacitor C comprises a field effect transistor T and a resistor R.

When the brake pedal is actuated, the voltage at the positive input of amplifier 55 has negative polarity and varies from a given value to a lower value, whereas the given value, determined by connection 57, still prevails at the negative terminal of amplifier 55. Consequently, the output of amplifier 55 is then positive and the corresponding current is stopped by diode 65 and cannot charge capacitor C.

The flow of current in field effect transistor T is controlled by amplifier 67 which, as explained hereinafter, receives a combination of signals determining the delay at its positive input 68, whereas its negative input is connected to the point 69 remote from earth of resistor R.

As we shall show, the voltage at point 68 is always negative. Consequently, the gate of transistor T is negative, so that when the vehicle moves, transistor T is always conductive and has negligible impedance.

Owing to the feedback connection between point 69 and the negative input of amplifier 67, the latter tends to balance the voltages between points 68 and 69. In other words, the voltage at point 69 is substantially equal to the voltage at point 68 which, together with resistor R, forms a current generator.

In short, the resistor R, which is thus supplied at point 69, can act via transistor T so as to modify the charging state of capacitor C at a rate which depends on the potential of point 69, i.e. on the potential of point 68.

When braking starts, a voltage unbalance occurs between the point E and the positive input of amplifier 65, and has to be compensated by the voltage variation at A, i.e. by the charge of capacitor C, via transistor T, by means of the current generator, the voltage required for modifying the charging state being maintained at point 69.

To fix ideas, in the inoperative state a voltage of $-10$ V is maintained at the input and output of amplifiers 55 and 56. During sudden braking, the voltage at the input of amplifier 55 rises to $-3$ V, since diode 65 prevents the voltage at point A from being modified by the direct connection 55 – 56. This modification is produced by the variation in the charge on capacitor C, which must therefore change from $-10$ V to $-3$ V during the time corresponding to the desired variation in the disc braking pressure.

The voltage at point 68 depends on the voltages at points 70, 71 and 72, which depend mainly on the voltage of the output 73 of amplifier 44; as already stated, the negative output of amplifier 44 receives the voltage representing the speed of the vehicle, e.g. an aircraft travelling on a runway.

By means of a voltage divider 73, the inoperative voltage at point 74 is selected so that it corresponds to the speed $V_2$ (45 meters per second in the chosen numerical example). Diode 75 cannot therefore be conductive (towards 70) unless the voltage at this point is even more negative.

The voltage divider 76 is selected so that the voltage at 77 leaving amplifier 44 is negative starting from the speed $V_1$ and, at the speed $V_2$, is more negative than the permanent negative voltage at point 74.

Accordingly, at speeds greater than $V_2$ (45 m/s), the voltage at 70 is the voltage at 74, i.e. the maximum voltage for charging capacitor C. Consequently the charging rate is the highest possible (100 b/s).

Below $V_2$ and as far as $V_1$, the voltage at 68 is equal to the voltage at 77, which is proportional to the speed.

If, however, the taxiing speed becomes less than $V_1$, amplifier 44 provides only a positive voltage, but a negative voltage then appears at the output of amplifier 45, whose negative input 78 is biased by voltage divider 79 at the voltage level corresponding to the speed $V_1$ (20 m/s in the example).

Below this value, therefore, the voltage at 81 becomes sufficiently negative for the field effect transistor 82 to become conductive and supply at point 72 the negative voltage of point 83 which is determined by voltage divider 84 and which is such that the voltage corresponds to the value $\theta_1$. Accordingly, this voltage is applied to point 68 so as to determine the increase in the charge of capacitor C.

As soon, however, as the brake is actuated and a voltage decrease appears at E, amplifier 85 becomes conductive since a voltage (see 32, FIG. 2) is applied by voltage divider 87 at its negative input 86, the voltage corresponding to a given pressure ($V_1$) in the brake actuators.

Accordingly, until pressure $P_1$ is reached in the brake, the output of amplifier 85 is negative, so that the field effect transistor 86 becomes conductive.

Since voltage divider 88 imposes at point 87 a bias voltage equal to the value of $\theta_2$ (100 b/s) as long as the pressure in the brake has not reached the value $P_1$, the charging rate of capacitor C, i.e. the rate of pressure increase in the brake, is equal to $\theta_2$ since the voltage is applied at point 71. When the value $P_1$ is reached, as previously explained, the voltage at point 68 is imposed by the voltage at point 77 ($V_1 < V < V_2$) or by the voltage at point 72 ($V < V_1$).

When the actual taxiing speed is very small, amplifiers 44 and 45 have positive voltages at their outputs, whereas the negative input of amplifier 46 is adjusted for a speed having the aforementioned low value and outputs a negative voltage such that the field effect transistor 66 is conductive.

Consequently diode 65, which prevented capacitor C from being directly charged via the output of amplifier 55, is short-circuited by transistor 66 and capacitor C can be charged, not via transistor T but directly via transistor 66. Charging is therefore almost instantaneous and, just as if there was a direct connection between the output of amplifier 55 and the input of amplifier 56, the voltage at E instantly becomes equal to the output voltage of amplifier 49, and there is no delay before pressure appears in actuators 5.

However, this very sudden difference in the rate of increase around the speed $V_0$ (the rate being very high below $V_0$ and very low above $V_0$) may result in faulty operation, and therefore the rate of increase at low speeds may be modified by connecting the (mainly protective) resistor 67 in series with a resistor 90 adapted to increase the charging time of capacitor C.

Conversely, when the brake device is released in the aforementioned example, the voltage at the output of amplifier 55 suddenly becomes more negative, so that the relatively postive charge which has accumulated in capacitor C can flow out via diode 65. Consequently the variation in the voltage at E immediately follows the variation in the control voltage, in accordance with the decrease in the pressure applied to the brake.

Consequently, there is no delay in the pressure decrease, in the sense of a reduction in the brake pressure.

In other words, diode 65 performs a double function; when the brake pressure increases, diode 65 delays the increase via capacitor C and its charging source (67, T, R), whereas when the pressure decreases, diode 65 prevents any delay in the pressure drop produced in the brakes.

The invention applies more particularly to brakes in the undercarriages of aircraft carrying heavy loads.

We claim:

1. A device for controlling the braking pressure of a carbon disc brake as for example in undercarriages of aircraft carrying a heavy load comprising at least one tachometric dynamo for determining the rotational speed of a disc of a brake, an inverted time-delay means acting to increase the pressure in the disc brake, means for applying the output of said dynamo to said delay means, a brake control means including a potentiometer with its output signal applied to the input of an operational amplifier followed by a second similar amplifier, said two amplifiers having a common negative feedback connection so as to operate as follower amplifiers for controlling braking pressure via a solenoid valve, the direct connection between the output of said first amplifier and said second amplifier comprising a diode which opposes the direct flow of current and a capacitor in parallel beyond said diode towards said second amplifier, and means controlled by voltage of said tachometric dynamo so as to modify the charging state of said capacitor if there is a variation in the input voltage of said first amplifier.

2. A device according to claim 1, wherein the tachometric dynamo voltage is applied in parallel to one input of a number of differential amplifiers whose other input if polarised in dependence on a speed threshold so as to change the sign of the output voltage of the corresponding differential amplifier when the threshold is passed, the output voltage of said differential amplifiers controlling a charge of the capacitor.

3. A device according to claim 2 wherein the means controlled by the tachometric dynamo voltage modifying the charge of the capacitor comprise a transistor controlled by the output of an operational amplifier forming a relay, one input thereof receiving a reference voltage from the tachometric dynamo and the otherinput being directly connected to the transistor output remote from the capacitor and to a ballast resistor.

4. A device according to claim 3, wherein the output voltage of the second follower amplifier is applied to a differential amplifier whose other input receives a reference voltage equal to the voltage level corresponding to a given pressure state in the braking device, the output voltage of the differential amplifier being applied to the control electrode of a transistor biased by a voltage corresponding to the maximum possible level of the rate of pressure increase, the output of the transistor being connected to the input of the operational amplifier forming a relay.

5. A device according to claim 2, wherein the output of one of the differential amplifiers controls a transistor biased by a voltage corresponding to the minimum level of the rate of pressure increase.

6. A device according to claim 2, wherein the diode providing a direct connection is shunted by a transistor whose control electrode is connected to the output of one of the differential amplifiers adjusted for a very low speed-threshold value.

7. A device according to claim 6, wherein the shunt circuit of the connecting diode comprises an additional resistor determining the rate of variation in the loading of the capacitor by the transistor.

* * * * *